United States Patent [19]
Schulz

[11] 3,921,596
[45] Nov. 25, 1975

[54] CONCENTRIC ROTARY ENGINE

[76] Inventor: John E. Schulz, 10707 Moorpark, Apt. 204, North Hollywood, Calif. 91602

[22] Filed: Sept. 11, 1974

[21] Appl. No.: 505,062

[52] U.S. Cl. ............................... 123/8.27; 123/8.45
[51] Int. Cl.² ........................................ F02B 53/00
[58] Field of Search ....... 123/8.27, 8.31, 8.19, 8.45; 418/248

[56] References Cited
UNITED STATES PATENTS

| | | | |
|---|---|---|---|
| 2,048,825 | 7/1936 | Smelser | 123/8.27 |
| 2,214,833 | 9/1940 | Hocker | 123/8.19 |
| 3,797,464 | 3/1974 | Abbey | 123/8.27 X |

FOREIGN PATENTS OR APPLICATIONS

| | | | |
|---|---|---|---|
| 1,900,439 | 8/1970 | Germany | 123/8.27 |

Primary Examiner—C. J. Husar
Assistant Examiner—Michael Koczo, Jr.
Attorney, Agent, or Firm—Donald Diamond

[57] ABSTRACT

A concentric rotary engine of the internal combustion type is provided which includes a rotor concentrically disposed within a hollow rotor housing and in slidable engagement with the inner surface of the rotor housing. A power transfer shaft is secured to the rotor and extends beyond the housing. The rotor has a perimetrical cam surface which defines, in the direction of axial rotation, a power lobe, an inlet pocket, an operating lobe and a combustion pocket. The engine is provided with one or more operating sections each of which includes an intake passage system associated with a leading gate system, an exhaust passage system associated with a trailing gate system and a combustion chamber disposed therebetween. The leading and trailing gate systems are in correlative spaced relationship and include, respectively, leading and trailing gates and leading and trailing gate housings therefor. The gate housings are integrated with the rotor housing and are in open mouth communication with the transverse width of the rotor cam surface. The gates are yieldably, sealingly and slidably disposed within their respective housings for sealingly and slidably engaging the rotor cam surface.

An operative section is defined by the leading and trailing gates and the combustion chamber disposed therebetween. An intake reservoir is defined by the portion of the rotor inlet pocket in cyclic communication with the operative section. An expansion receiver is defined by the portion of the rotor combustion pocket in cyclic communication with the operative section. The rotor operating lobe is provided with an entrance channel for conveying fluid to the intake reservoir and is provided with an exit channel for withdrawing fluid from the expansion receiver. The intake passage system is adapted to cooperate with and selectively admit fluid into the entrance channel and the exhaust passage system is adapted to cooperate with and selectively exhaust fluid from the exit channel. Means are provided for initiating combustion of combustible fluid in the combustion chamber.

30 Claims, 29 Drawing Figures

CONCENTRIC ROTARY ENGINE

FIELD OF THE INVENTION

This invention relates to rotary engines and, more particularly, to concentric rotary engines of the internal combustion type.

The invention is characterized by unique simplicity and compactness and provides novel and efficient means for feeding and compressing intake fluids and exhausting spent gases.

OBJECTS

An object of this invention is to provide an improved rotary engine having a rotor of novel design concentrically disposed within a cylindrical housing therefor.

Another object of this invention is to provide a rotary engine of the character described wherein the rotor has a perimetrical cam configuration defining lobe portions separated by pocket portions.

A further object of this invention is to provide a rotary engine of the character described wherein the lobe and pocket portions of the rotor define, in the direction of axial rotation, power lobe means, inlet pocket means, operating lobe means and combustion pocket means.

A still further object of this invention is to provide a rotary engine of the character described which includes a leading gate system, a trailing gate system and combustion chamber means disposed therebetween.

Yet another object of this invention is to provide a rotary engine of the character described wherein the leading and trailing gate systems include, respectively, leading and trailing gate means and leading and trailing housings therefor, with the leading and trailing gate housings being integrated with the rotor housing and in open mouth communication with the transverse width of the rotor cam surface, and with the leading and trailing gate means being yieldably, sealingly and slidably disposed within their respective housings for sealingly and slidably engaging the transverse width of the rotor cam surface.

A further object of this invention is to provide a rotary engine of the character described which includes operative section means delimited by the leading and trailing gate means and the combustion chamber means disposed therebetween.

A still further object of this invention is to provide a rotary engine of the character described having intake reservoir means and expansion receiver means with the intake reservoir means being defined by the portion of the rotor inlet pocket means in cyclic cooperation and communication with the operative section means and with the expansion receiver means being defined by the portion of the rotor combustion pocket means in cyclic cooperation and communication with the operative section means.

Yet another object of this invention is to provide a rotary engine of the character described which includes rotor entrance means for conveying fluid to the intake reservoir means and rotor exit means for withdrawing fluid from the expansion receiver means.

A further object of this invention is to provide a rotary engine of the character described which includes intake passage means associated with the leading gate system for selectively admitting fluid into the rotor entrance means and exhaust passage means associated with the trailing gate system for selectively exhausting fluid from the rotor exit means.

A still further object of this invention is to provide a rotary engine of the character described wherein the advancing face of the power lobe means cooperates with the combustion chamber means and the leading gate means for defining a fuel compression space and the rearward face of the power lobe means cooperate with the combustion chamber means and the trailing gate means for defining a combustion products expansion space.

Yet another object of this invention is to provide a rotary engine of the character described which includes means for withdrawing fluid compressibly entrapped between the power lobe means and the leading gate means when the leading gate means is in spaced relationship to the combustion chamber means.

SUMMARY OF THE INVENTION

In accordance with this invention, there is provided a concentric rotary engine of the internal combustion type which includes a rotor housing having an inner surface which defines a hollow, cylindrical chamber. A rotor is concentrically disposed within the chamber and is adapted to rotatably engage the inner surface of the housing. A power transfer shaft is secured to the rotor and extends beyond the housing.

The rotor has a perimetrical cam surface comprising lobe portions separated by pocket portions. In the direction of axial rotation, these sequentially disposed lobe and pocket portions define a power lobe, an inlet pocket, an operating lobe and a combustion pocket. The lobe portions may comprise a single power lobe/operating lobe assembly or they may comprise multiple power lobe/operating lobe assemblies separated by appropriate pocket portions.

The rotary engine is provided with correlatively spaced, leading and trailing gate systems which include, respectively, leading and trailing gates and leading and trailing gate housings therefor. The gate housings are integrated with the rotor housing and are in open mouth communication with the transverse width of the rotor cam surface. The gates are yieldably, sealingly and slidably disposed within their respective housings for sealingly and slidably engaging the transverse width of the rotor cam surface.

A combustion chamber is recessed in the inner surface of the rotor housing between the leading and trailing gates.

An operative section is defined by the leading and trailing gates and the combustion chamber disposed therebetween.

An intake reservoir is defined by the portion of the rotor inlet pocket in cyclic cooperation and communication with the operative section. An expansion receiver is defined by the portion of the rotor combustion pocket in cyclic cooperation and communication with the operative section.

The operating lobe is provided with a rotor entrance channel for conveying fluid to the intake reservoir and is provided with a rotor exit channel for withdrawing fluid from the expansion receiver.

A controlled, intake passage system is associated with the leading gate system for selectively admitting fluid into the rotor entrance channel. A controlled, exhaust passage system is associated with the trailing gate system for selectively exhausting fluid from the exit channel.

Means are provided for withdrawing fluid compressibly entrapped between the power lobe and the leading gate when the leading gate is in spaced relationship to the combustion chamber; and means are provided for initiating combustion of combustible fluid in the combustion chamber.

The leading and trailing gate systems and the intake and exhaust passage systems together with the combustion chamber comprise an operating section and the rotary engine may be provided with a plurality of such sections.

The rotor housing may advantageously be provided with first and second, correlative, external conduits for admitting fluid into the housing and discharging compressed fluid therefrom, with the conduits being disposed in the non-combustion portion of the housing between the leading and trailing gates.

DETAILED DESCRIPTION

Figures 1, 2:
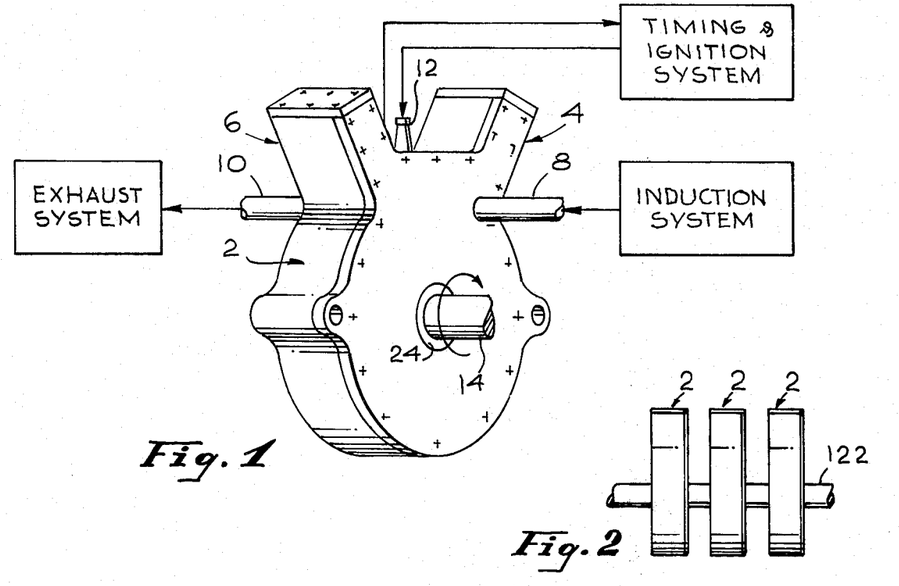
FIG. 1 is a perspective view of an encased rotary engine embodying the features of the present invention.
FIG. 2 schematically illustrates three rotary engines having a common power shaft.

Referring to the drawings and, in particular, to FIG. 1, there is shown a rotary engine having a rotor housing 2, a leading gate housing 4, a trailing gate housing 6, an intake conduit 8, an exhaust conduit 10, a spark plug 12 and a power shaft 14. The gate and rotor housings are adapted to be disassembled to provide access to the interior thereof.

Figure 3:
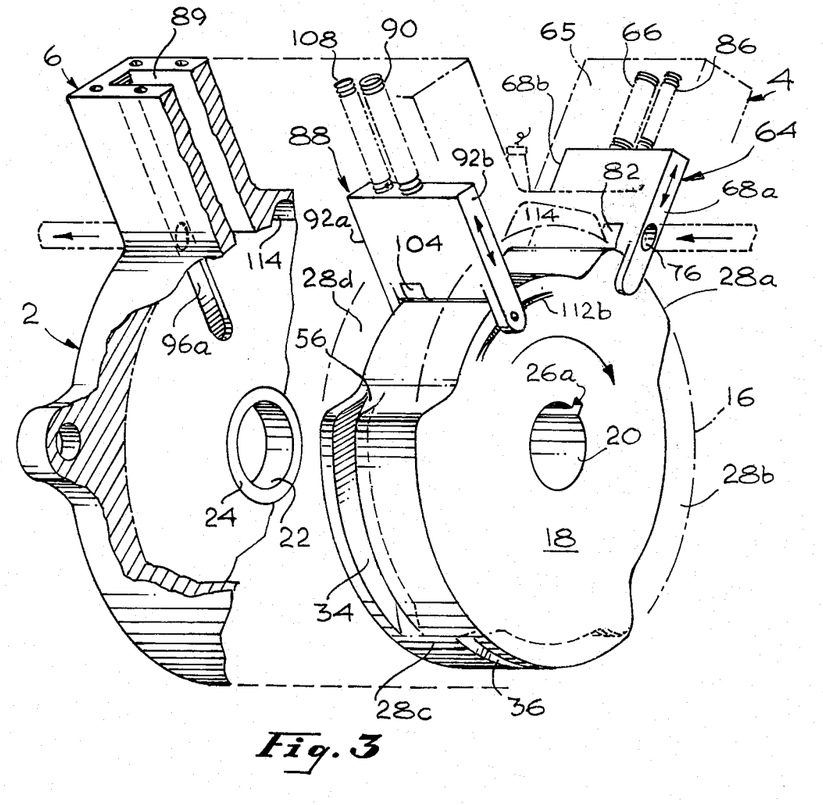
FIG. 3 is an enlarged perspective view of the rotary engine with the housing in phantom lines and including a fragmentary view of the gate housing and the inner surface of the rotor housing side wall.

The inner surface 16 of the rotor housing, as shown in FIG. 3, defines a hollow, cylindrical chamber. A rotor 18 is concentrically disposed within the chamber and rotatably engages the inner surface. The rotor is provided with a concentric, transverse opening 20. The opposite ends of the transverse opening are in alignment with corresponding orifices 22 in the opposite side walls of the rotor housing, with the orifices being defined by suitable bearing members 24. The power shaft 14 is disposed within the transverse opening and extends through the orifices of the bearing members beyond the housing. This shaft, which is rotatably disposed within the bearing orifices, is secured to the rotor by suitable locking means. In an exemplary embodiment, the shaft is provided with a longitudinal tongue or spline 26 for lockingly engaging a corresponding longitudinal groove 26a recessed in the rotor along the transverse opening, or a key-way assembly may be so employed.

Figures 18, 19:
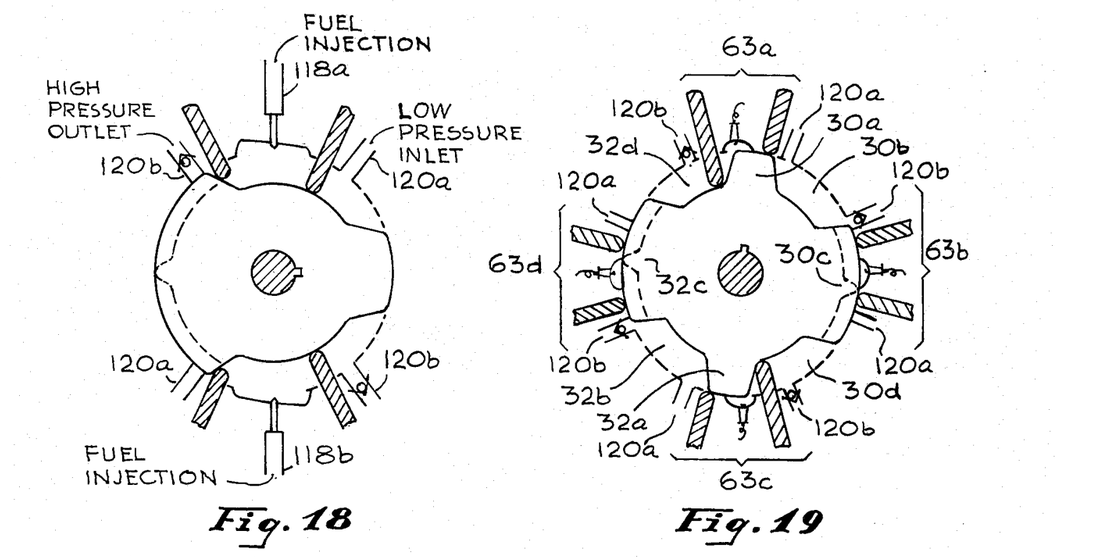
FIG. 18 schematically illustrates a diesel-type rotary engine having two operating sections and two conduit pairs for providing compressed fluid.
FIG. 19 schematically illustrates a rotary engine having four operating sections and two power lobe/operating lobe assemblies with appropriate pocket portions.

The perimetrical surface of the rotor has a cam configuration defining lobe portions separated by pocket portions. The lobe portions comprise power lobe means and operating lobe means and the pocket portions comprise inlet pocket means and combustion pocket means. The cam configuration, as shown in FIG. 3, defines, in the direction of axial rotation, a power lobe 28a, and inlet pocket 28b, an operating lobe 28c and a combustion pocket 28d. A multiple power lobe/operating lobe configuration is shown in FIG. 19 which includes a first power lobe 30a, a first inlet pocket 30b, a first operating lobe 30c, a first combustion pocket 30d, a second power lobe 32a, a second inlet pocket 32b, a second operating lobe 32c and a second combustion pocket 32d. Thus, in one aspect, the lobe portions comprise a single power lobe and a single operating lobe, with appropriate pocket portions; and, in a second aspect, the lobe portions comprise multiple power lobes with a corresponding number of operating lobes and appropriate pocket portions.

Figures 4, 4A, 4B, 5, 5A:
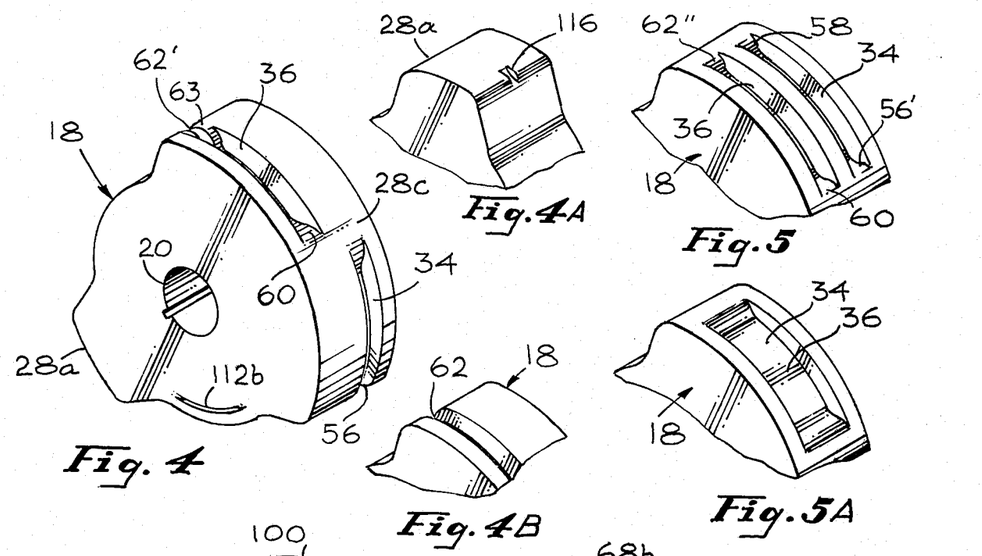
FIG. 4 is a perspective view of the rotor showing the exit and entrance channels in the operating lobe and the trailing gate releasable locking groove in the rotor side wall.
FIG. 4A is a fragmentary view of the rotor showing a pressure relief groove bridging the anterior corner of the power lobe.
FIG. 4B is a fragmentary view of the operating lobe showing the entrance channel of the operating lobe being confluent with the rotor inlet pocket.
FIG. 5 is a fragmentary view of the operating lobe showing the entrance and exit channels in latitudinal spaced relationship and in complete overlapping alignment.
FIG. 5A is a fragmentary view of the operating lobe showing the entrance and exit channels as a sequentially disposed continuous channel.
Figures 20, 21, 22, 23:
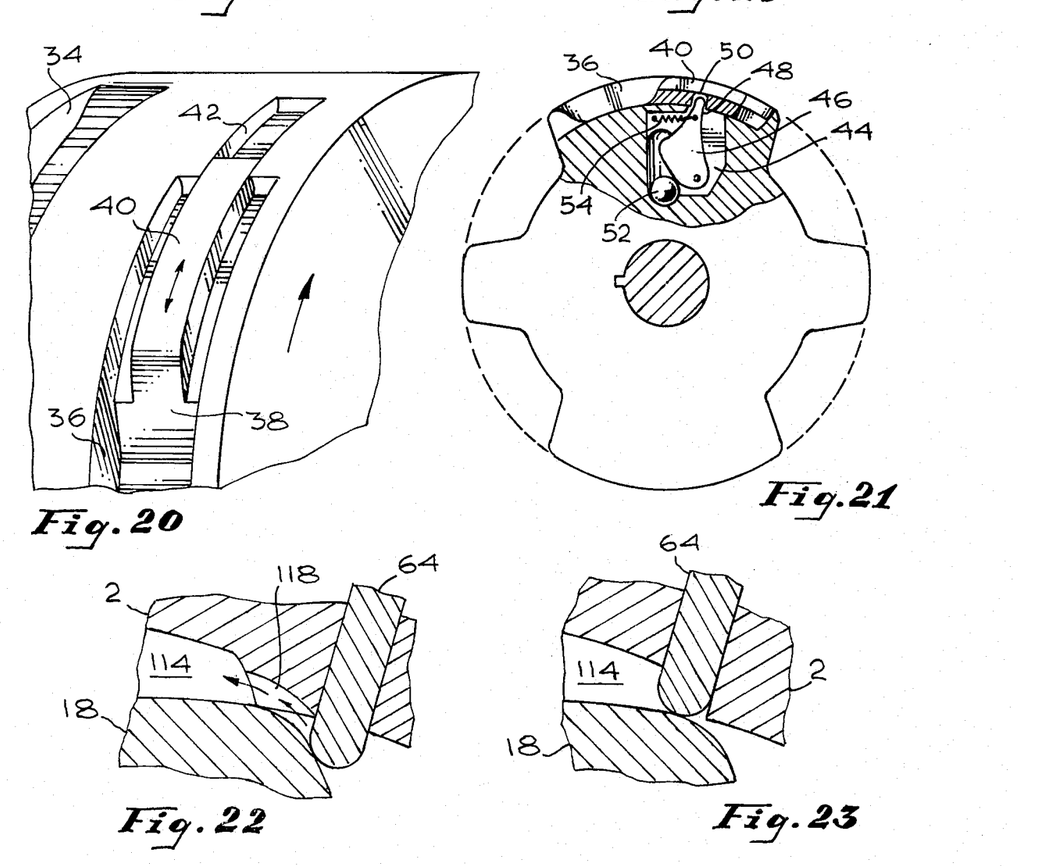
FIG. 20 is a perspective view of a slidable closure disposed within the entrance channel for varying the operative volume thereof and the fluid entrance timing.
FIG. 21 is a schematic illustration of a centrifugally operated device for actuating the slidable closure in the entrance channel.
FIG. 22 is a fragmentary sectional view of the operative section showing the leading gate in spaced relationship to the combustion chamber and a pressure relief conduit in the rotor housing extending from the leading gate to the combustion chamber.
FIG. 23 is a fragmentary, sectional view of the operative section showing the leading gate forming the anterior wall of the combustion chamber.

The perimetrical surface of the operating lobe is provided with an exit channel 34 and and an entrance channel 36. In one embodiment, the exit and entrance channels are substantially arcuately disposed and in substantially latitudinal spaced relationship. As to this embodiment, the channels may be in mutually exclusive arcuate alignment as shown in FIGS. 3 and 4; in complete overlapping arcuate alignment as shown in FIG. 5; or in partial overlapping arcuate alignment as shown in FIG. 20. In a second embodiment, the rotor exit and entrance channels form a sequentially disposed continuous channel as shown in FIG. 5A.

When the exit and entrance channels are latitudinally spaced and in overlapping alignment, at least one of the channels may be provided with a slidable closure for selectively varying the operative portions of such channel and for selectively varying the arcuate alignment of the operative portion of such channel with respect to the other channel.

In an illustrative embodiment, as shown in Flg. 20, the entrance channel is provided with a slidable closure 38 having an arcuately disposed flange 40 which is adapted to slidably engage a furrow 42 which extends arcuately forward from the leading end of the channel. Thus, the slidable closure is adapted to selectively vary the operative portion of the entrance channel and to selectively vary the arcuate alignment of the operative portion of this channel with respect to the exit channel.

As schematically shown in FIG. 21, a centrifugally operated device may be employed to actuate the slidable closure. In this connection, a partial, transverse portion of the rotor is excised to provide a chamber 44 for a pivotally disposed, angular member 46 having a lever arm 48 in engagement with a slot 50 in the slidable closure for reciprocally sliding the closure as a function of centrifugal force. Centrifugal force is imparted to the angular member by means of a suitable weight 52 slidably disposed in the chamber with respect to this member. A tension spring 54 having one end connected to the lever of the angular member and the other end connected to the chamber wall is employed to impart appropriate centripetal force to the angular member. A like slidable closure and centrifugal actuator may be utilized in connection with the exit channel.

The exit channel has a leading end and trailing end 58. In one embodiment, the leading end 56 is confluent with the combustion pocket as shown in FIG. 3. In an alternative embodiment, the leading end 56' is disposed within the operating lobe in spaced relationship to the combustion pocket as shown in FIG. 5. The trailing end of the exit channel is provided with a cam contour to the surface of the operating lobe when this channel terminates within the lobe.

The entrance channel has a leading end 60 and a trailing end. In a first embodiment, the trailing end 62 is confluent with the rotor inlet pocket as shown in FIG. 4B. In a second embodiment, the trailing end 62' terminates in a foraminous member 63 having a cam contour to the rotor surface, with the foraminous member extending communication of the entrance channel to the inlet pocket as shown in FIG. 4. In a third embodiment, the trailing end 62'' terminates in a cam contour to the rotor surface in spaced relationship to the inlet pocket as shown in FIG. 5.

The rotary engine is provided with one or more operating sections. Each operating section includes a controlled intake passage system associated with a leading gate system, a controlled exhaust passage system associated with a trailing gate system and a combustion chamber disposed therebetween, with the leading and trailing gate systems being in correlative, spaced relationship.

A rotary engine having one operating section is shown in FIGS. 1 and 3 and a rotary engine having four operating sections 63a, 63b, 63c, 63d, is illustrated in FIG. 19.

The leading gate system includes a leading gate 64 and a leading gate housing therefor 4. The leading gate housing, which is integrated with the rotor housing 2, defines a leading gate aperture 65 which is in open mouth communication with the transverse width of the rotor cam surface. The leading gate is yieldably, sealingly and slidably disposed within the leading gate aperture for sealingly and slidably engaging the transverse width of the rotor cam surface. A yieldable expansion spring 66 is interposed and suitably retained between the top wall of the leading gate and the upper wall of the leading gate housing for yieldably biasing the leading gate against the rotor cam surface.

The opposite side walls 68a, 68b of the leading gate extend laterally beyond the side walls of the rotor and are provided with rotor directed, extending flanges 70a, 70b which overlie a portion of the oppositely disposed, rotor side walls and slidably and sealingly engage the same; and the side walls of the rotor housing are provided with mating slots 72a, 72b for sealingly and slidably receiving the flanges as a function of the cam configuration of the rotor's perimetrical surface.

An intake passage system is associated with the leading gate system and is adapted to cooperate with and selectively admit fluid into the entrance channel in the operating lobe. The intake passage system includes an intake port 74 in the leading gate housing 4, an intake orifice 76 in the leading gate for communicating with the intake port, and an intake aperture 78 in the leading gate in communication with the intake orifice and having an outlet orifice 80 for communicating with the entrance channel in the operating lobe.

The intake passage system also includes an intake valve 82. This valve is yieldably, sealingly and slidably disposed within the intake aperture for releasably sealing this aperture. The intake valve, when disposed within the intake aperture, forms a unitary assembly with the leading gate for sealingly and slidably engaging the rotor cam surface. A stem 84, having one end secured to the intake valve, extends upwardly through a conduit in the leading gate. A yieldable expansion spring 86 is interposed and suitably retained between the top of the stem and the upper wall of the leading gate housing for biasing the intake valve against the rotor cam surface and into the entrance channel as hereinafter described.

Figure 14:
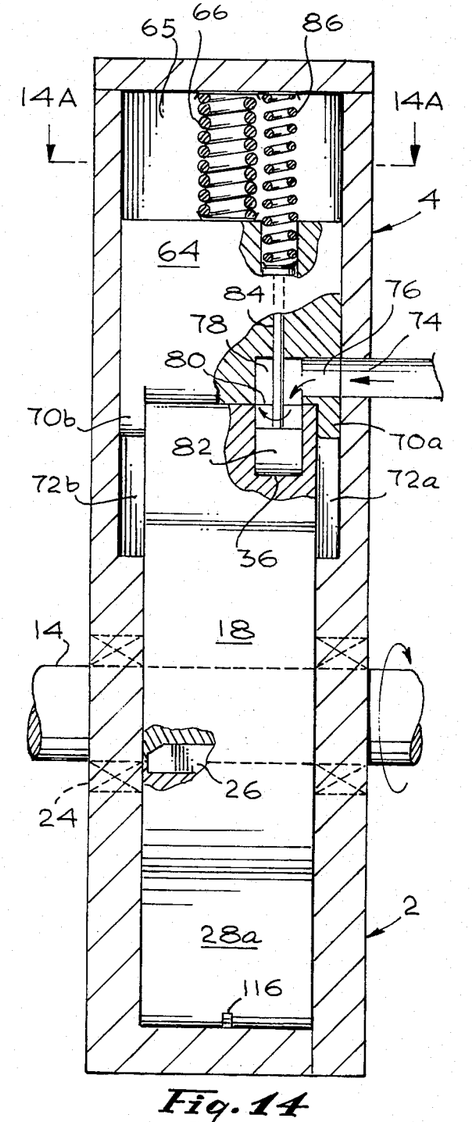
FIG. 14 is a section along line 14—14 of FIG. 8 and shows the intake valve biased into the entrance channel.
Figure 14A:
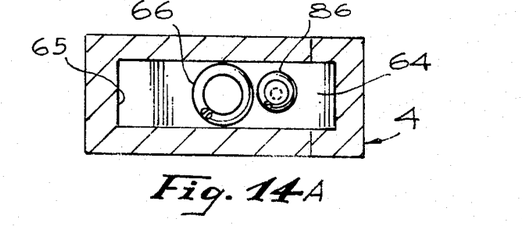
FIG. 14A is a section along line 14A—14A of FIG. 14.
Figure 15:
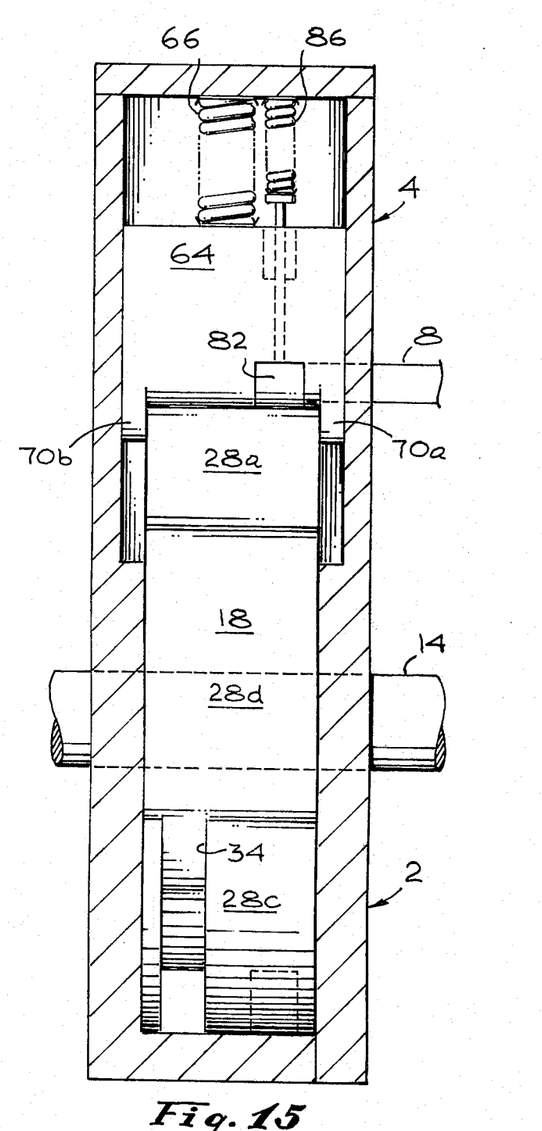
FIG. 15 is a section along line 15—15 of FIG. 11 and shows the intake valve disposed within the intake aperture in the sealing position.

The entrance channel in the operating lobe is in cooperative alignment with the outlet orifice of the intake aperture. As the leading end of the entrance channel slidably engages the outlet orifice, the intake valve is biased into the entrance channel and slidably engages the same during the slidable engagement of the entrance channel with the outlet orifice, and thereby permits fluid communication between the outlet orifice and the channel as shown in FIG. 14. At the trailing end of the entrance channel, the intake valve is returned to its sealing position within the intake aperture. The intake orifice 76 is in cooperative fluid flow alignment with the intake port 74 during slidable engagement of the entrance channel with the outlet orifice. However, when a pocket portion of the rotor is in slidable engagement with the leading gate/intake valve unitary assembly, the assembly is biased into the pocket and the intake orifice is displaced from registration with the intake port.

The trailing gate system includes a trailing gate 88 and a trailing gate housing therefor 6. The trailing gate housing, which is integrated with the rotor housing, defines aa trailing gate aperture 89 which is in open mouth communication with the transverse width of the rotor cam surface. The trailing gate is yieldably, sealingly and slidably disposed within the trailing gate aperture for sealingly and slidably engaging the transverse width of the rotor cam surface. A yieldable expansion spring 90 is interposed and suitably retained between the top wall of the trailing gate and the upper wall of the trailing gate housing for yieldably biasing the trailing gate against the rotor cam surface.

The opposite side walls 92a, 92b of the trailing gate extend laterally beyond the side walls of the rotor and are provided with rotor directed, extending flanges 94a, 94b which overlie a portion of the oppositely disposed, rotor side walls and slidably and sealingly engage the same; and the side walls of the rotor housing are provided with mating slots 96a, 96b for sealingly and slidably receiving the flanges as a function of the cam configuration of the rotor's perimetrical surface.

An exhaust passage system is associated with the trailing gate system and is adapted to cooperate with and selectively exhaust spent gases from the exit channel in the operating lobe. The exhaust passage system includes an exhaust port 98 in the trailing gate housing 6, an exhaust orifice 100 in the trailing gate for communicating with the exhaust port, and an exhaust aperture 102 in the trailing gate in communication with the exhaust orifice and having an inlet orifice 103 for communicating with the exit channel in the operating lobe.

The exhaust passage system also includes an exhaust valve 104. This valve is yieldably, sealingly and slidably disposed within the exhaust aperture for releasably sealing this aperture. The exhaust valve, when disposed within the exhaust aperture, forms a unitary assembly with the trailing gate for sealingly and slidably engaging the rotor cam surface. A stem 106, having one end secured to the exhaust valve, extends upwardly through a conduit in the trailing gate. A yieldable expansion spring 108 is interposed and suitably retained between the top of the stem and the upper wall of the trailing gate housing for biasing the exhaust valve against the rotor cam surface and into the exit channel as hereinafter described.

Figure 16:
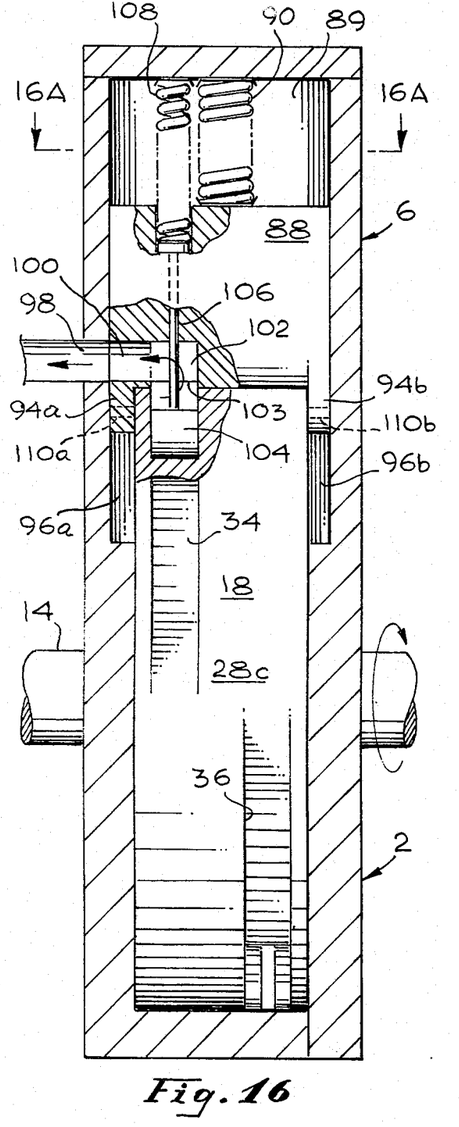
FIG. 16 is a section along line 16—16 of FIG. 12 and shows the exhaust valve biased into the operating lobe exit channel.
Figure 16A:
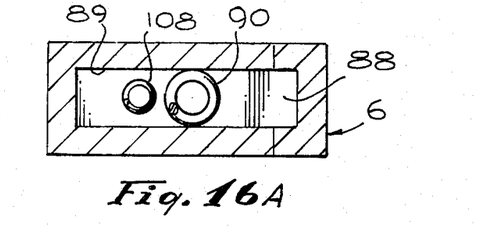
FIG. 16A is a section along line 16A—16A of FIG. 16.
Figure 17:
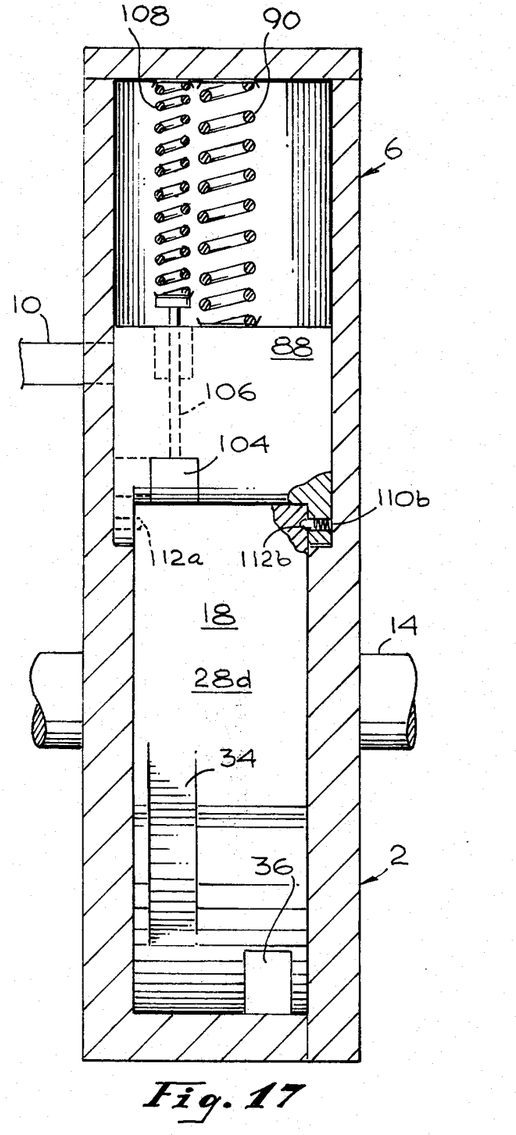
FIG. 17 is a section along line 17—17 of FIG. 11 and shows the exhaust valve disposed within the exhaust aperture in the sealing position.

The exit channel in the operating lobe is in cooperative alignment with the inlet orifice of the exhaust aperture. As the leading end of the exit channel slidably engages the inlet orifice, the exhaust valve is biased into the exit channel and slidably engages the same during the slidable engagement of the exit channel with the inlet orifice, and thereby permits fluid communication between the exit channel and the inlet orifice as shown in FIG. 16. At the trailing end of the exit channel, the exhaust valve is returned to its sealing position within the exhaust aperture. The exhaust orifice 100 is in cooperative fluid flow alignment with the exhaust port 98 in the trailing gate housing during slidable engagement of the exit channel with the inlet orifice. However, when a pocket portion of the rotor is in slidable engagement with the trailing gate/exhaust valve unitary assembly, the assembly is biased into the pocket and the exhaust orifice is displaced from registration with the exhaust port.

Releasable locking means are provided for radially securing the trailing gate to the rotor during combustion while not impeding axial rotation of the rotor. For this purpose, spring biased pins 110a, 110b are resiliently disposed in the opposite flanges of the trailing gate for slidably engaging the side walls of the rotor. Releasable locking grooves 112a, 112b having cam surfaces at the leading and trailing ends are disposed in the opposite rotor side walls rearwardly adjacent to the trailing face of the power lobe so as to slidably and lockingly engage the pins during combustion. Similar releasable locking means can be provided for radially securing the leading gate to the rotor during compression.

Figure 6:
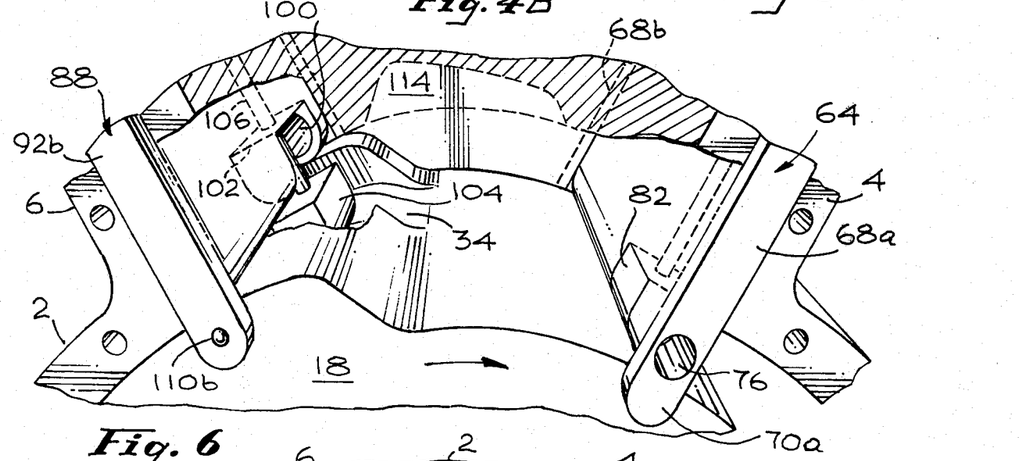
FIG. 6 is an enlarged fragmentary view of the expansion receiver and shows the exhaust valve biased into the operating lobe exit channel.

A combustion chamber 114 is recessed in the inner surfaces of the rotor housing between the leading and trailing gates. These gates together with the combustion chamber disposed therebetween define an operative section. The portion of the rotor inlet pocket and the portion of the rotor combustion pocket in sequential cyclic cooperation with the operative section define, respectively, an intake reservoir (FIG. 7) and an expansion receiver (FIG. 6).

The leading and trailing gates may be in abutting or spaced relationship to the combustion chamber. However, when the leading gate is spaced from the combustion chamber, then means are provided for removing fluid entrapped anteriorly of the combustion chamber between the advancing face of the power lobe and the leading gate. In a first embodiment, the fluid is transported to the intake reservoir and in a second embodiment, the fluid is returned to the fluid input or feed system. As to the first embodiment, the means for withdrawing the entrapped fluid may take the form of a groove 116 disposed within and bridging the anterior corner of the power lobe as shown in FIGS. 4A and 10A. In an alternative aspect, the means for withdrawing the entrapped fluid may take the form of a conduit 118 disposed within the inner surface of the rotor housing and extending from the leading gate to the combustion chamber as shown in FIG. 22.

As to the embodiments shown in FIGS. 5 and 5A, the operating lobe thereof is, advantageously, about one-half of the arcuate length of the operating lobe 28c as shown in FIGS. 3 and 4, while the arcuate length of the channels in FIGS. 5 and 5A generally does not exceed the arcuate distance between the leading and trailing gates such that the exhaust valve is biased into its sealing position in the exhaust aperture at or before the time that the intake valve is biased into the entrance channel whereby substantially mutually exclusive fluid flow systems are defined.

Figure 7:
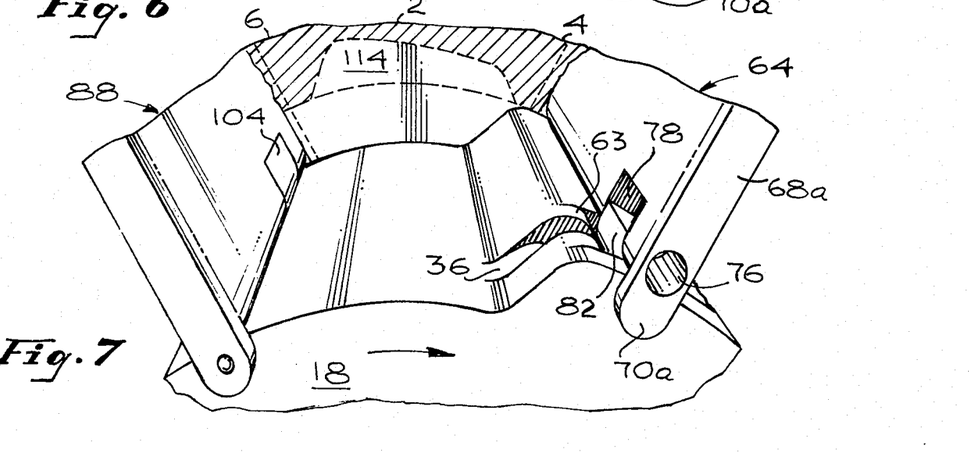
FIG. 7 is an enlarged fragmentary view of the intake reservoir and shows the intake valve biased into the operating lobe entrance channel.
Figure 8:
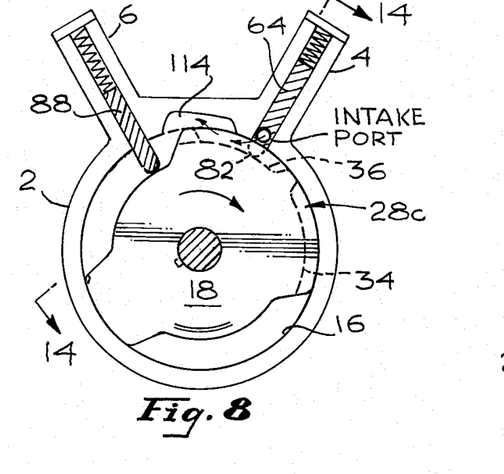
FIGS. 8—13 schematically illustrate the positions of the gates and the rotor lobes during the several stages of the engine cycle.
Figure 9:
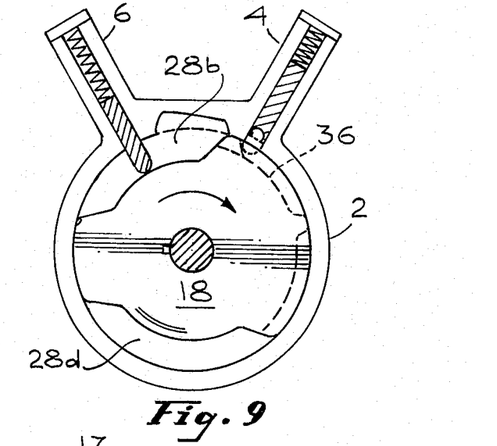

The operation of the rotary engine is schematically shown in FIGS. 8–13. In the intake portion of the cycle, the entrance channel 36 in the operating lobe 28c is in slidable engagement with the outlet orifice 80 of the intake aperture 78, the intake valve 82 is biased into the entrance channel, and the intake orifice 76 of the intake aperture is in fluid flow communication with the intake port 74 in the leading gate housing. This positioning of components permits a fluid such as air or a fuel/air mixture to pass through the intake passage system to the entrance channel and thence to the intake reservoir as shown in FIGS. 8, 14 and 7. The intake valve is returned to its sealing position in the intake aperture by the cam contour of the foraminous member at the trailing end of the entrance channel as shown in FIGS. 9 and 7.

Figure 10:
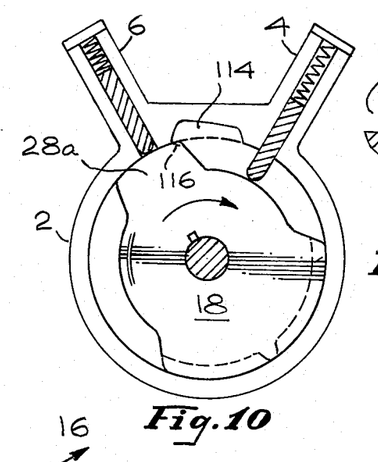
Figures 10A, 11:
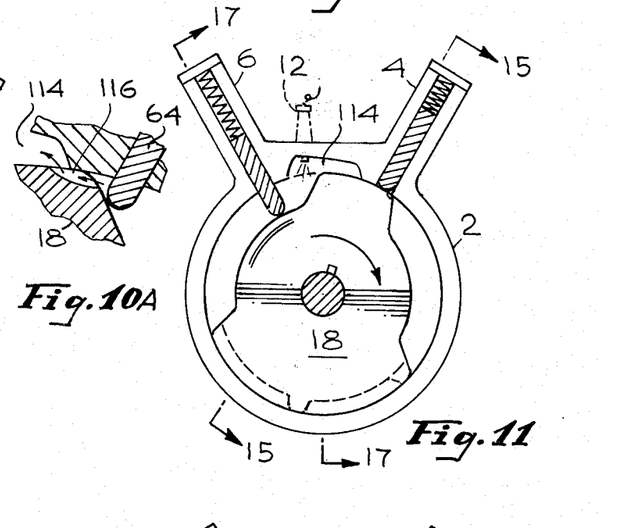

During the compression phase of the cycle, the power lobe 28a displaces the fuel-air mixture from the intake reservoir and compresses the same into the combustion chamber 114 as shown in FIG. 10. However, as the leading face of the power lobe passes the leading wall of the combustion chamber, a portion of the fuel-air mixture is entrapped in the space defined by the power lobe, leading gate and rotor housing. The entrapped fuel-air mixture is transported to the combustion chamber by means of a groove 116 bridging the anterior corner of the power lobe as more particularly shown in FIG. 10A.

As the leading face of the power lobe passes the leading gate, the compressed air-fuel mixture is ignited by a suitably timed spark plug actuator 12, as illustrated in FIG. 11, whereby the rotor and power shaft are propelled in a clockwise direction.

Figure 12:
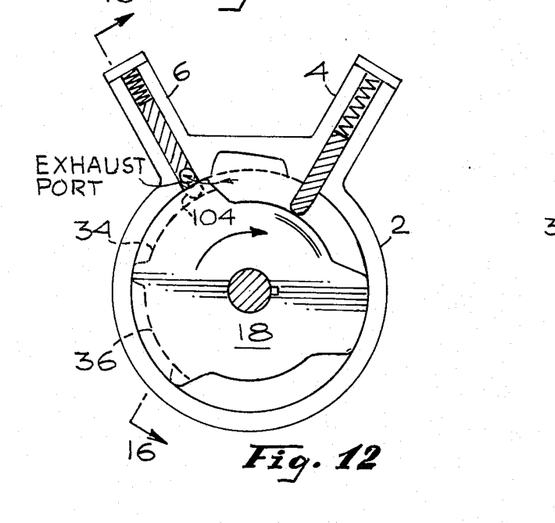
Figure 13:
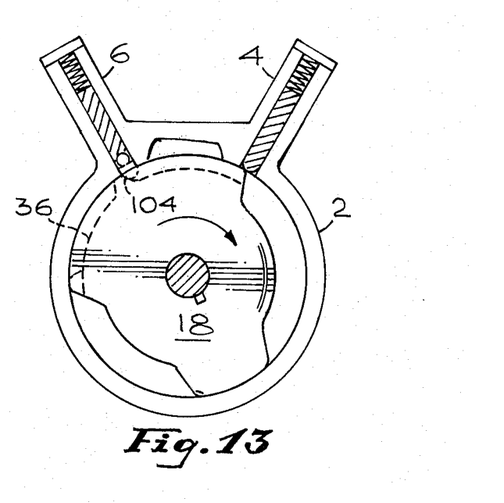

In the exhaust phase of the cycle, the exit channel 34 in the operating lobe 28c is in slidable engagement with the inlet orifice 103 of the exhaust aperture 102, the exhaust valve 104 is biased into the exit channel, and the exhaust orifice 100 is in fluid flow communication with the exhaust port 98 in the trailing gate housing. This positioning of components permits spent gases to pass from the expansion receiver to the exit channel and thereafter to be discharged via the exhaust passage system as shown in FIGS. 12, 16 and 6. The exhaust valve is returned to its sealing position in the exhaust aperture by the cam contour at the trailing end of the exit channel as illustrated in FIG. 13.

The anterior portion of the entrance channel may overlap the posterior portion of the exit channel and may be provided with a centrifugally actuated slidable closure as hereinabove described. As the rate of rotation of a rotor, so equipped, increases, the slidable closure will be centrifugally actuated to lengthen and thereby enlarge the operative portion of the entrance channel. The lengthening of the entrance channel not only increases the operative volume of the entrance channel but also advances the time at which the fuel-air mixture enters the entrance channel with respect to the trailing end of the exit channel. Conversely, as the rate of rotation of the rotor decreases, centripetally acting forces will actuate the slidable closure to reduce the length of the operative portion of the entrance channel.

As shown in FIG. 18, the rotary engine of this invention can be used in a diesel-type operation wherein air is admitted through the intake passage system and fuel is admitted directly into the combustion chamber through a fuel injector. The rotary engine illustrated in FIG. 18 is provided with two operating sections with each operating section including a fuel injector 118a, 118b.

The rotor housing, as shown in FIGS. 18 and 19, is provided with pairs of correlative, intake and discharge conduits 120a, 120b disposed in the non-combustion portion of the housing between the leading and trailing gates for admitting fluid into the rotor housing and discharging compressed fluid therefrom. The discharge cnduits 120b are provided with appropriate check valves. The conduits may be employed to compress air which can then be utilized in fuel combustion and/or in emission control. These passages may also be used for admitting and compressing fuel-air mixtures.

A plurality of rotary engines can be mounted to a common power shaft. As shown in FIG. 2, three rotary engines are mounted to a common power transmittal shaft 122.

The rotary engine of this invention, as will be recognized by those of ordinary skill in the art, may be fabricated from any suitable material. Also, the rotary engine is oiled and cooled in accordance with means well known to those in the art.

While in the foregoing description and accompanying drawing there has been shown and described and preferred embodiment of this invention, it will be understood, of course, that minor changes may be made in the details of construction as well as in the combination and arrangement of parts without departing from the spirit and scope of the invention as claimed.

That which is claimed is:

1. A rotary engine of the internal combustion type, comprising:
   a rotor housing having an inner surface which defines a hollow, cylindrical chamber;
   a rotor concentrically disposed within said cylindrical chamber and in rotatable engagement with said inner surface;
   power transfer means secured to said rotor and extending beyond said housing;
   said rotor having a perimetrical cam surface which defines, in the direction of axial rotation, power lobe means, inlet pocket means, operating lobe means and combustion pocket means;
   a leading gate system and a trailing gate system, said leading and trailing gate systems being in correlative spaced relationship and, including, respectively, leading and trailing gate means and leading and trailing gate housings therefor, said leading and trailing gate housing being integrated with said rotor housing and in open mouth communication with the transverse width of the rotor cam surface, said leading and trailing gate means being yieldably, sealingly and slidably disposed within their respective housings for sealingly and slidably engaging the transverse width of the rotor cam surface;
   combustion chamber means recessed in the inner surface of said rotor housing between said leading and trailing gate means;
   operative section means delimited by the leading and trailing gate means and the combustion chamber means disposed therebetween;
   intake reservoir means defined by the portion of the rotor inlet pocket means in cyclic cooperation and communication with the operative section means;
   expansion receiver means defined by the portion of the rotor combustion pocket means in cyclic cooperation and communication with the operative section means;
   rotor entrance means in said operative lobe for conveying fluid to said intake reservoir means and rotor exit means in said operating lobe for withdrawing fluid from said expansion receiver means;
   said leading gate system comprising intake passage means cooperating with said rotor entrance means for selectively admitting fluid into said rotor entrance means;
   said trailing gate system comprising exhaust passage means cooperating with said rotor exit means for selectively exhausting fluid from said rotor exit means;

means for withdrawing fluid compressively entrapped between the power lobe means and the leading gate means when the leading gate means is in spaced relationship to the combustion chamber means; and means for initiating combustion of combustible fluid in said combustion chamber means.

2. An engine according to claim 1 wherein the leading gate means is in cooperative engagement with a first, rotor directed, yieldable biasing means and the trailing gate means is in cooperative engagement with a second, rotor directed, yieldable biasing means.

3. An engine according to claim 2 wherein the first biasing means is a leading gate spring having one end secured to the leading gate means and the other end secured to the leading gate housing and the second biasing means is a trailing gate spring having one end secured to the trailing gate means and tothe other end secured to the trailing gate housing.

4. An engine according to claim 3 wherein each of the leading and trailing gate means extends, bilaterally, beyond the transverse width of the rotor cam surface and each of said gate means is provided with a pair of oppositely extending flanges which overlie a portion of the rotor side walls adjacent to the rotor cam surface, and the inner surface of said rotor housing is provided with mating slots for slidably and sealingly receiving said flanges.

5. An engine according to claim 4 which includes releasable locking means for radially securing said trailing gate means to said rotor during combustion while permitting axial rotation of said rotor.

6. An engine according to claim 5 wherein the releasable locking means comprise a pair of cooperating pin and groove assemblies, with the pins being resiliently secured to the inner walls of the oppositely disposed flanges of the trailing gate means and biased towards the opposing rotor side walls, and said grooves being arcuately disposed in the opposing rotor side walls for lockingly engaging said pins during combustion, and each of said grooves having a trailing end terminating in a cam contour to the surface of the adjoining rotor side wall.

7. An engine according to claim 6 wherein the rotor exit means comprises an exit channel in the surface of the operating lobe means and the rotor entrance means comprises an entrance channel in the surface of the operating lobe means.

8. An engine according to claim 7 wherein said exit and entrance channels are substantially arcuately disposed and in substantially latitudinal spaced relationship.

9. An engine according to claim 8 wherein said exit and entrance channels are in mutually exclusive arcuate alignment.

10. An engine according to claim 8 wherein said exit and entrance channels are in overlapping arcuate alignment and at least one of said channels is provided with centrifugally actuated slidable closure means for selectively varying the operative portion of such channel and for selectively varying the arcuate alignment of the operative portion of such channel with respect to the other channel.

11. An engine according to claim 10 wherein the exit and entrance channels are in partial overlapping alignment.

12. An engine according to claim 10 wherein the exit and entrance channels are in complete overlapping alignment.

13. An engine according to claim 7 wherein said exit and entrance channels form a sequentially disposed continuous channel.

14. An engine according to claim 7 wherein the exit channel has a leading end and a trailing end with the trailing end having a cam contour to the surface of the operating lobe means.

15. An engine according to claim 14 wherein the exit channel leading end is in communication with the combustion pocket.

16. An engine according to claim 14 wherein the exit channel leading end is disposed within the operating lobe means in spaced relationship to the combustion pocket.

17. An engine according to claim 8 wherein the entrance channel has a leading end and a trailing end.

18. An engine acording to claim 17 wherein the entrance channel trailing end is confluent with said rotor inlet pocket.

19. An engine according to claim 17 wherein the entrance channel trailing end terminates in a foraminous member having an cam contour to the rotor surface and extending communication of the entrance channel to the inlet pocket.

20. An engine according to claim 17 wherein the entrance channel trailing end terminates in a cam contour within the operating lobe means in spaced relationship to the inlet pocket.

21. An engine according to claim 7 wherein the intake passage means comprise:

an intake port in said leading gate housing;

an intake orifice in said leading gate for communicating with said inlet port;

intake aperture means in said leading gate means, said aperture means being in communication with said inlet orifice and having an outlet orifice for communicating with said rotor entrance channel, said entrance channel being in cooperative alignment with said outlet orifice for slidably engaging the same;

an intake valve sealingly, slidably and yieldably disposed within said intake aperture means for releasably sealing said aperture means and for sealingly and slidably engaging the rotor cam surface as a unitary assembly with said leading gate means;

said intake valve being displaceable into said rotor entrance channel for slidably engaging the same during the slidable engagement of the entrance channel with the outlet orifice to permit communication between said outlet orifice and said entrance channel; and said intake orifice being in communication with said intake port during the slidable engagement of said entrance channel with said outlet orifice.

22. An engine according to claim 21 wherein the intake valve is in cooperative engagement with a rotor directed, yieldable, intake valve biasing means.

23. An engine according to claim 22 wherein the intake valve biasing means comprises a spring and stem assembly disposed through a substantially longitudinal aperture in the leading gate means with the stem being secured to the intake valve and the spring being secured to the leading gate housing.

24. An engine according to claim 23 wherein the exhaust passage means comprise:

an exhaust port in said trailing gate housing;

an exhaust orifice in said trailing gate means for communicating with said exhaust port;

exhaust aperture means in said trailing gate means, said aperture means being in communication with said exhaust orifice and having an inlet orifice for communicating with said rotor exit channel, said exit channel being in cooperative alignment with said inlet orifice for slidably engaging the same;

an exhaust valve sealingly, slidably and yieldably disposed within said exhaust aperture means for releasably sealing said aperture means and for sealingly and slidably engaging the rotor cam surface as a unitary assembly with said trailing gate means;

said exhaust valve being displaceable into said rotor exit channel for slidably engaging the same during the slidable engagement of the exit channel with the inlet orifice to permit communication between said exit channel and said inlet orifice; and said exhaust orifice being in communication with said exhaust port during slidable engagement of said exit channel with said inlet orifice.

25. An engine according to claim 24 wherein the exhaust valve is in cooperative engagement with a rotor directed, yieldable, exhaust valve biasing means.

26. An engine according to claim 25 wherein the exhaust valve biasing means comprises a spring and stem assembly disposed through a substantially longitudinal aperture in the trailing gate means with the stem being secured to the exhaust valve and the spring being secured to the trailing gate housing.

27. An engine according to claim 1 wherein the means for withdrawing fluid compressibly entrapped between the power lobe means and the leading gate means is a groove disposed within the bridging the anterior corner of the power lobe.

28. An engine according to claim 1 wherein the means for withdrawing fluid compressibly entrapped between the power lobe means and the leading gate means is a conduit in the inner surface of the rotor housing for extending communication from the leading gate means to the combustion chamber means.

29. An engine according to claim 1 wherein the rotor housing is provided with first and second, correlative, external conduits for admitting fluid into the rotor housing and discharging compressed fluid therefrom, said conduits being disposed in the non-combustion portion of the rotor housing between the leading and trailing gate means.

30. An engine according to claim 1 wherein said intake passage means is adapted for admitting air into the rotor entrance means and fuel injecting means are provided for admitting fuel directly into the combustion chamber means.

* * * * *